United States Patent [19]

Choi et al.

[11] Patent Number: 5,682,275
[45] Date of Patent: Oct. 28, 1997

[54] MAGNETIC RECORDING AND REPRODUCING APPARATUS HAVING A SINGLE MOTOR DRIVING DEVICE FOR CONTROLLING LOADING FUNCTIONS

[75] Inventors: Jeong Don Choi; In Ki Cheon, both of Seoul; Geun Hyuk Song, Kyungki-Do; Hee Yoon Park, Seoul, all of Rep. of Korea

[73] Assignee: Goldstar Co., Inc., Seoul, Rep. of Korea

[21] Appl. No.: 667,882

[22] Filed: Jun. 20, 1996

Related U.S. Application Data

[63] Continuation of Ser. No. 390,432, Feb. 17, 1995, abandoned, which is a continuation of Ser. No. 153,898, Nov. 17, 1993, abandoned.

[30] Foreign Application Priority Data

Nov. 21, 1992 [KR] Rep. of Korea ............... 21989

[51] Int. Cl.[6] ............................................. G11B 15/665
[52] U.S. Cl. ............................................. 360/85; 360/95
[58] Field of Search ............................................. 360/85, 93, 95, 360/96.5, 96.6

[56] References Cited

U.S. PATENT DOCUMENTS

| | | | |
|---|---|---|---|
| 4,652,947 | 3/1987 | Oka et al. | 360/85 |
| 4,907,110 | 3/1990 | Ando | 360/85 |
| 4,951,164 | 8/1990 | Yasaka et al. | 360/85 |
| 4,984,105 | 1/1991 | Hwang | 360/85 |
| 5,034,830 | 7/1991 | Lee | 360/85 |
| 5,043,832 | 8/1991 | Ueda et al. | 360/85 |
| 5,053,901 | 10/1991 | Yamada et al. | 360/85 |
| 5,093,752 | 3/1992 | Sato et al. | 360/85 |
| 5,144,505 | 9/1992 | Kaneko et al. | 360/85 |
| 5,159,507 | 10/1992 | Tamura et al. | 360/85 |
| 5,172,283 | 12/1992 | Fukuyama et al. | 360/85 |
| 5,285,332 | 2/1994 | Konishi et al. | 360/85 |

*Primary Examiner*—Stuart S. Levy
*Assistant Examiner*—Kevin M. Watkins
*Attorney, Agent, or Firm*—Birch, Stewart, Kolasch & Birch, LLP

[57] ABSTRACT

A driving device for a magnetic recording and reproducing apparatus having a simple construction. The driving device includes a loading motor, a first spur gear and a first worm, a second spur gear and a second worm mounted on a base plate such that they are parallel to the first spur gear and the first worm, an actuating gear provided between the base plate and an actuating plate and engaging with the second worm, a pinch roller actuating gear engaging with the first actuating gear, a first gear provided on the actuating plate and engaging with the first actuating gear, a pinch drive assembly having an input gear at its lower section. This input gear engages with the pinch roller actuating gear. The driving device also includes a tape cassette loading housing having a worm gear engaging with the first worm. In the driving device of the present invention, the pinch drive assembly, the actuating plate and the front loading housing are commonly operated by the loading motor, so that the driving device has a light, thin, simple and compact construction and reduces manufacturing cost.

20 Claims, 7 Drawing Sheets

MAGNETIC RECORDING AND REPRODUCING APPARATUS HAVING A SINGLE MOTOR DRIVING DEVICE FOR CONTROLLING LOADING FUNCTIONS

This application is a continuation of application Ser. No. 08/390,432 filed on Feb. 17, 1995, now abandoned, which is a continuation of application Ser. No. 08/153,898, filed on Nov. 17, 1993, now abandoned.

BACKGROUND OF THE INVENTION

1. Field of the Invention

The present invention relates to a magnetic recording and reproducing apparatus such as a video tape recorder, and more particularly to a driving device for the magnetic recording and reproducing apparatus.

2. Description of the Prior Art

In a conventional driving device of a video tape recorder, a rotational force from a loading motor is transmitted to a cam gear mounted at a middle portion of a base plate through a plurality of transmission gears, thus to rotate this cam gear. The cam gear has a cam slot for operating an actuating plate, so that the rotation of the cam gear causes a linear movement of the actuating plate. In addition, a sector gear is provided between the cam gear and a loading gear for driving the loading gear.

A pinch roller, coming into rotatable contact with a capstan shaft for running a tape of the tape cassette through a tape running path on the deck, is turned from a mouth of the tape cassette to the capstan shaft by a pinch arm mounted on the base plate. Here, the pinch arm cooperates with the cam slot of the cam gear.

However, the above driving device has a complex construction and requires a variety of elements, thus to have a problem in that it causes a difficulty in its manufacture and increases its manufacturing cost.

SUMMARY OF THE INVENTION

It is, therefore, an object of the present invention to provide a driving device for a magnetic recording and reproducing apparatus in which the aforementioned problems can be overcome and which makes a pinch drive assembly, an actuating plate and a front loading housing be commonly operated by a single loading motor at an appropriate reduction gear ratio, thus to have a light, thin, simple and compact construction and to reduce manufacturing cost.

In order to accomplish the above object, a driving device for a magnetic recording and reproducing apparatus in accordance with the present invention comprises a loading motor mounted on a base plate at a side of a tape take-up reel; a first spur gear and a first worm integrally formed with each other and mounted on an output shaft of the loading motor; a second spur gear and a second worm integrally formed with each other and mounted on the base plate such that they are parallel to the first spur gear and the first worm, respectively, the second spur gear engaging with the first spur gear; a first actuating gear provided between the base plate and an actuating plate and engaging with the second worm; a pinch roller actuating gear engaging with the first actuating gear; a first gear provided on the actuating plate and engaging with the first actuating gear; a pinch drive assembly having an input gear at its lower section, the input gear engaging with the pinch roller actuating gear; a tape cassette loading housing having a worm gear engaging with the first worm; and the pinch drive assembly, the actuating plate and the front loading housing being commonly operated by the loading motor. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
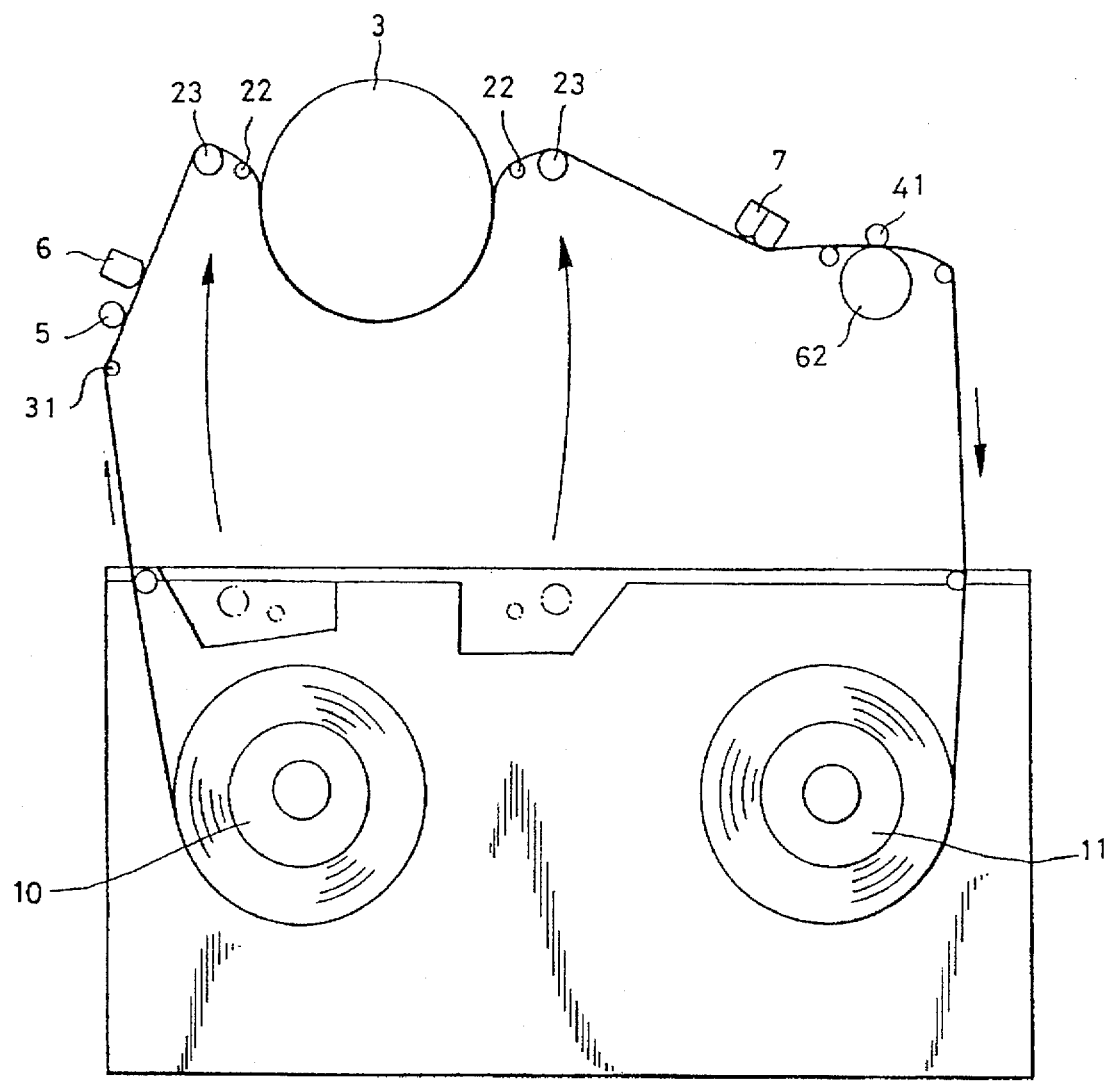
FIG. 1 is a schematic plan view of an overall construction of a deck mechanism of a magnetic recording and reproducing apparatus in accordance with the present invention.
Figure 2:
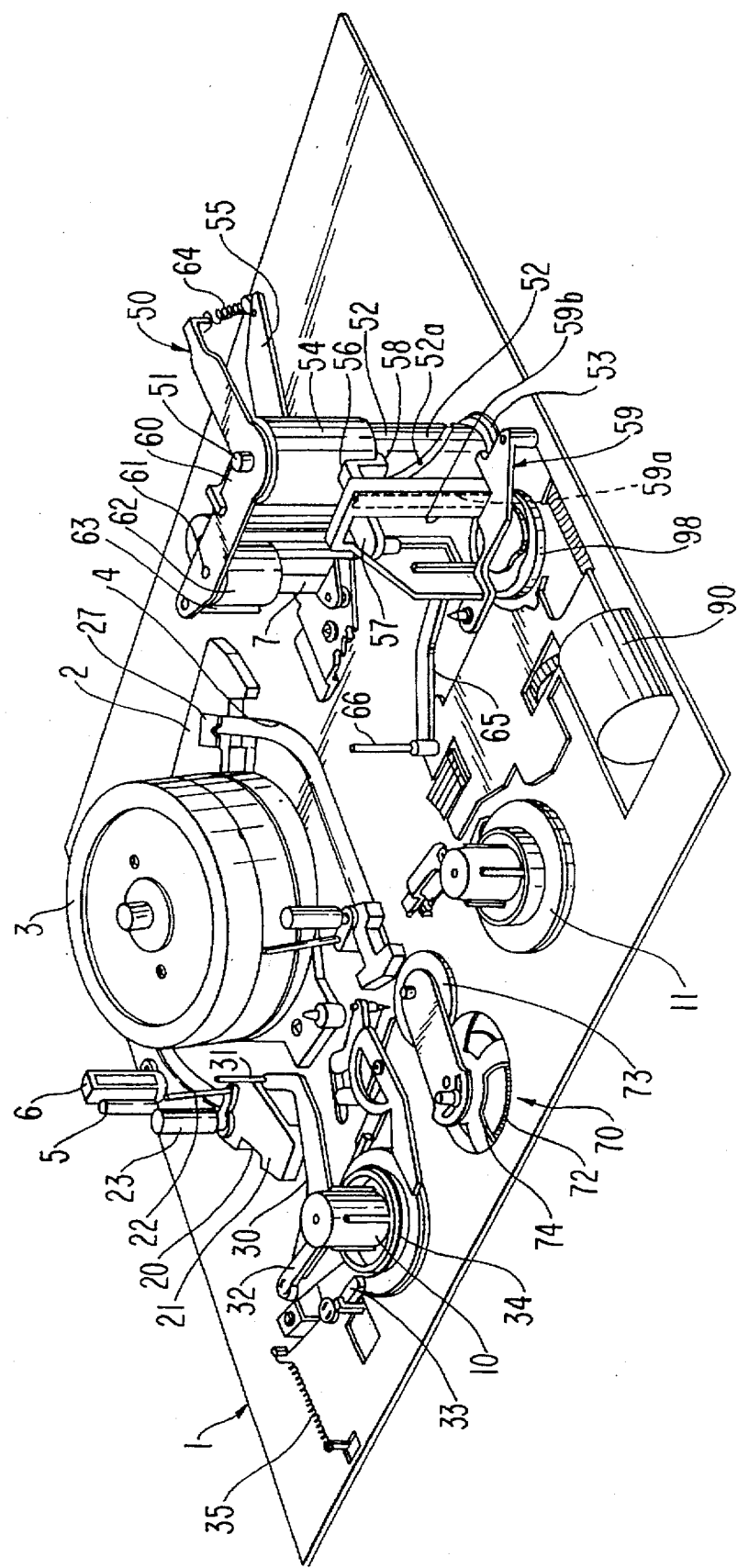
FIG. 2 is a perspective plan view of the deck mechanism of FIG. 1.

As shown in FIG. 2, the deck mechanism includes a base plate 1 and a head base 2 fixedly mounted on the rear portion of the base plate 1. A rotating head drum 3 is mounted on the head base 2 such that it is inclined to the base plate 1. At the front portion of the base plate 1, a tape supply reel 10 and a tape take-up reel 11 are disposed to be spaced apart from each other by a predetermined distance. In both sides of the head drum 3, a pair of loading guide slots 4 are formed in the base plate 1, respectively.

A guide roller 5 and an erase head 6 are disposed on one side of the head drum 3. On the other side of the head drum 3, an audio control head assembly 7 is disposed.

As shown in FIG. 2, a slant post assembly 20 is received in each loading guide slot 4 to slide along the loading guide slot 4 forwardly and rearwardly.

Figure 5:
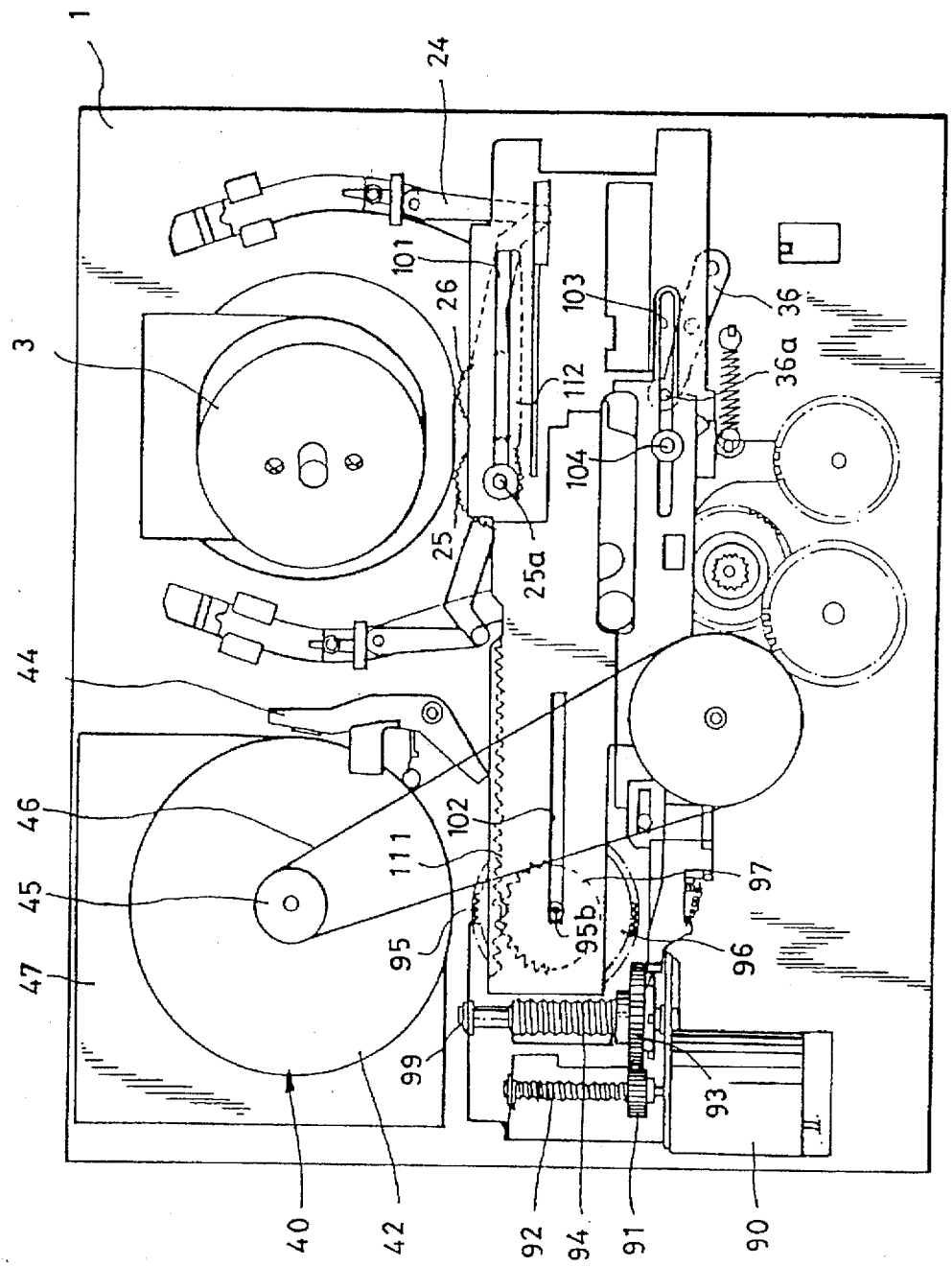
FIG. 5 is a bottom view of the deck mechanism of FIG. 1.

Each slant post assembly 20 includes a slant post base 21 coupled to the loading guide slot 4, a slant post 22 mounted on the slant post base 21, and a guide roller 23 mounted on the slant post base 21. As shown in FIG. 5, the slant post assemblies 20 are connected to a first loading gear 25 and a second loading gear 26 both rotatably mounted to the base plate 1, by means of link type loading arms 24, respectively.

Figure 3:
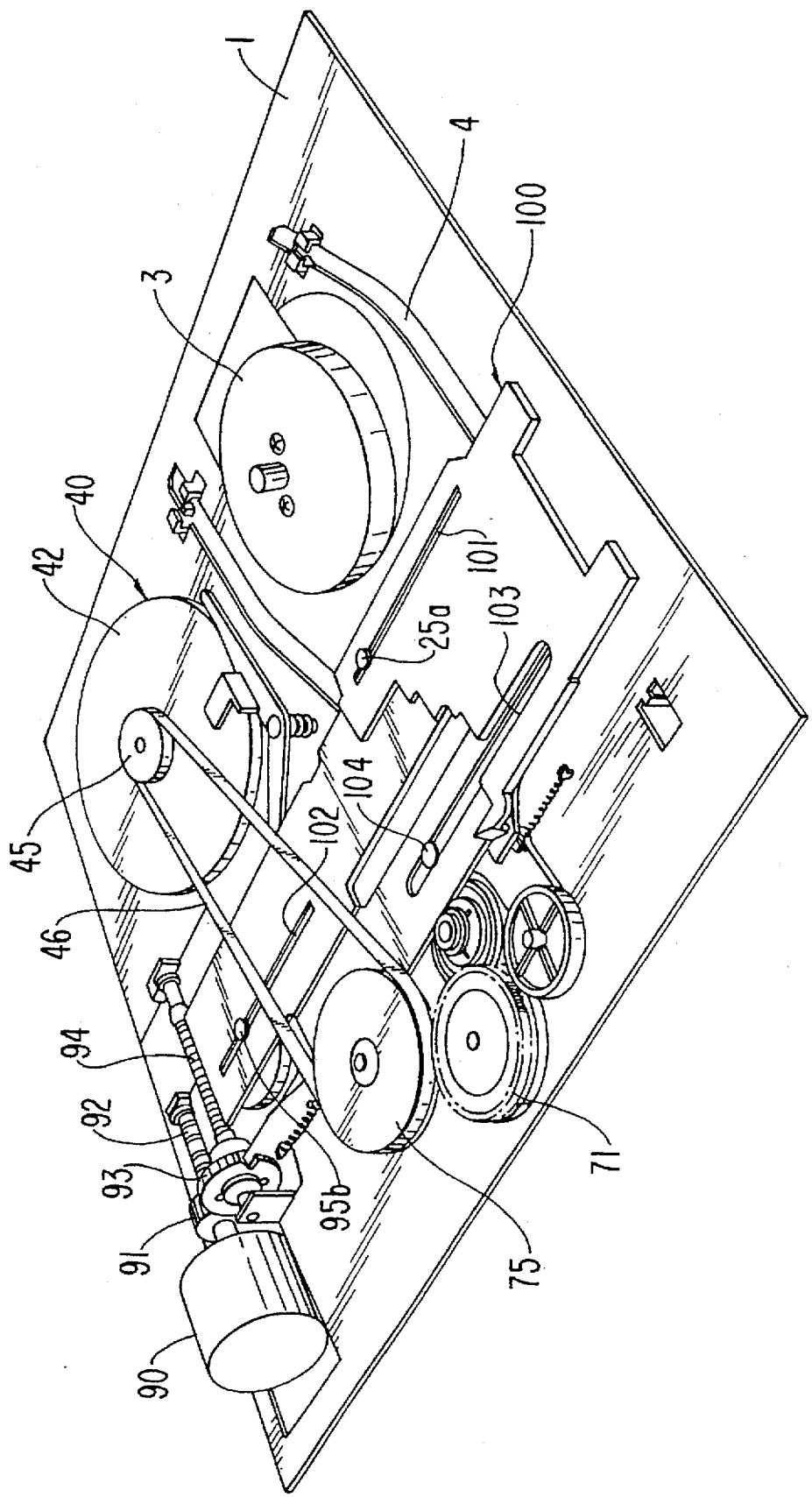
FIG. 3 is a perspective bottom view of the deck mechanism of FIG. 1.

On one side of the supply reel 10, a tension adjusting arm 30 of which one end supports a tension adjusting post 31 is mounted on the base plate 1 at the other end thereof. A capstan motor 40 having a capstan shaft 41 is disposed on one side of the audio control head assembly 7 as shown in FIG. 3. On one side of the capstan motor 40, a pinch arm 60 is pivotally mounted to a shaft 51 fixed to the base plate 1 as shown in FIG. 2. The pinch arm 60 has a pinch roller 62 rotatably mounted to one end, namely, the front end of the pinch arm 60 and a tape guide pin 63 mounted to the front end of the pinch arm 60 forwardly of the pinch roller 62.

As shown in FIG. 2, a take-up arm 65 is connected at one end thereof to the pinch arm 60. A take-up post 66 is mounted to the other end of the take-up arm 65.

Figure 4:
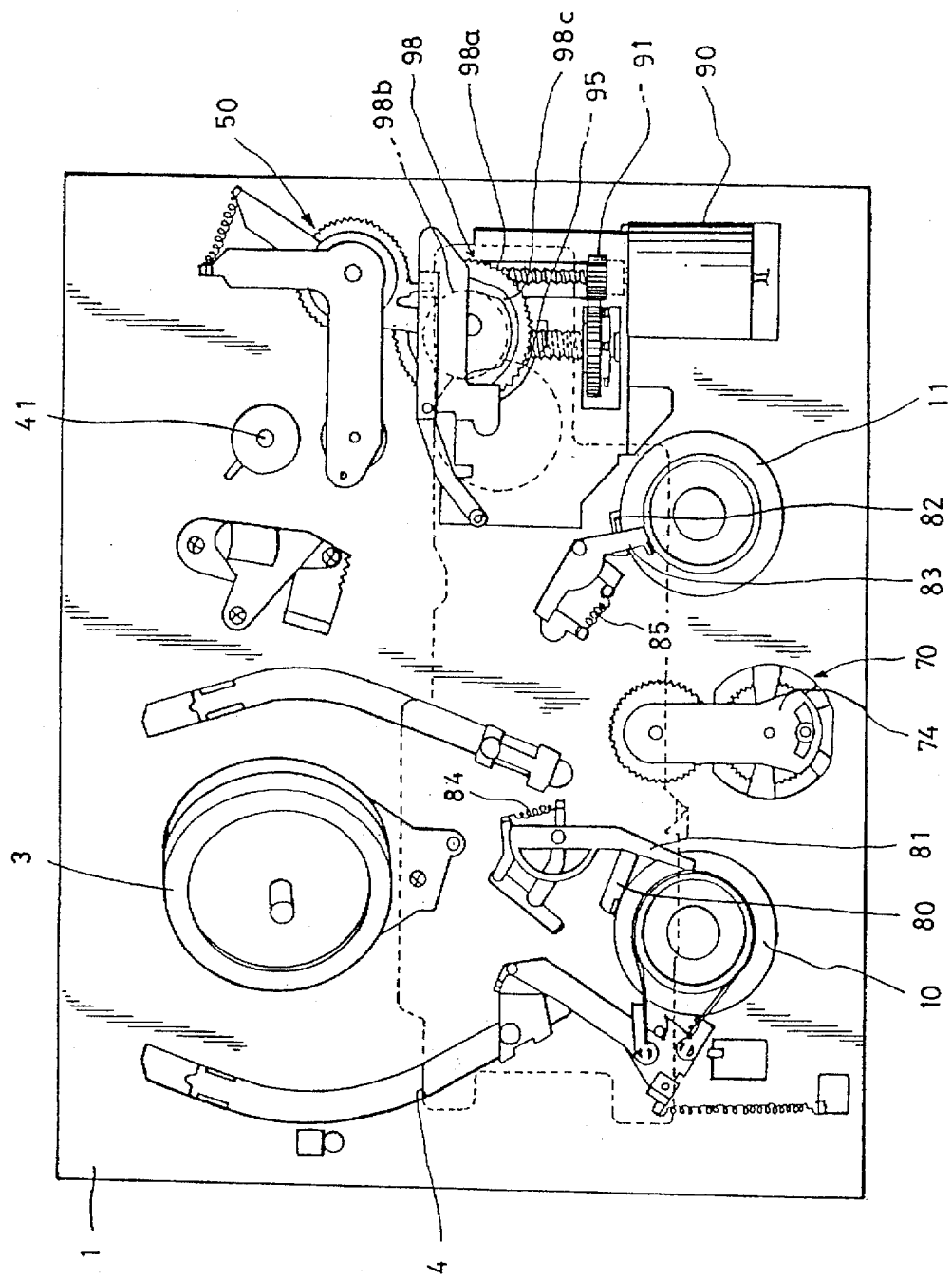
FIG. 4 is a plan view of the deck mechanism of FIG. 1.

On side of the supply reel 10, a supply-side main brake 80 and a supply-side soft brake 81 are disposed, as shown in FIG. 4. These brakes 80 and 81 are connected to each other by means of a supply-side brake spring 84. Similarly, a take-up-side main brake 82 and a take-up-side soft brake 83 are disposed on the side of the take-up reel 11 and connected to each other by means of a take-up-side brake spring 85.

In the rear end of each loading guide slot 4, a V-shaped stopper 27 is fitted in order to serve to stop a movement of the corresponding slant post assembly 20 as shown in FIG. 2.

A tension band 34 is connected at both ends thereof to the tension adjusting arm 30 by means of a first connecting lever 32 and a second connecting lever 33, respectively. The tension band 34 is wrapped about the outer circumferential surface of the supply reel 10. To the tension adjusting arm 30, a tension spring 35 is also connected at one end thereof. The other end of the tension spring 35 is fixedly mounted to the base plate 1.

As shown in FIG. 5, a tension transmission lever 36 adapted to drive the tension adjusting arm 30 is pivotally mounted at one end thereof to the base plate 1 to pivot about a pin 36a.

The capstan motor 40 is fixedly mounted to the lower surface of the base plate 1. As shown in FIG. 4, the capstan shaft 41 of the capstan motor 40 protrudes upwardly from the base plate 1. To a lower end of the capstan shaft 41, a pulley 45 of a capstan rotor 42 is fixedly mounted as shown in FIG. 3.

An idler mechanism 70 is mounted on the base plate 1 between the supply reel 10 and the take-Up reel 11. As shown in FIG. 3, the idler mechanism 70 includes an input gear 71 which is rotatably mounted on the base plate 1 and gears into a pulley gear 75. This pulley gear 75 is mounted on the base plate 1 such that it neighbors the base plate 1. The pulley 45 of the capstan rotor 42 is connected to the pulley gear 75 by a belt 46.

As shown in FIG. 2, the idler mechanism 70 further includes an idler gear 73 rotatably mounted to one end of an idler arm 74. This idler gear 73 gears into an output gear 72 of the mechanism 70.

A pinch drive assembly 50 is provided for driving the pinch roller 62 between a tape loading position and a tape unloading position as shown in FIG. 2. The pinch drive assembly 50 includes a rotatable cylindrical cam 52 having a spiral cam groove 52a on its outer circumferential surface, and having an input gear 53 on its lower end. The assembly 50 further includes a reciprocating cylinder 54 fitted around the cylindrical cam 52 to move upwardly or downwardly according to rotation of the cylindrical cam 52. A pinch roller actuating gear 98 is added to the assembly 50. This gear 98 engages with the input gear 53 and rotates the cylindrical cam 52.

The cylindrical cam 52, the reciprocating cylinder 54 and the pinch arm 60 are coupled to the common shaft 51, fixed to the base plate 1, one after another. A support lever 55 is provided on the upper end of the reciprocating cylinder 54. The support lever 55 is connected to the other end, namely, the rear end of the pinch arm 60 by a tension coil spring 64, as shown in FIG. 2.

The reciprocating cylinder 54, having at its upper end the support lever 55, has at its lower end a guide protrusion 56, a cam lever 57 and a cam protrusion 58 as shown in FIG. 2. The cam protrusion 58 is received in the spiral cam groove 52a of the cylindrical cam 52. The guide protrusion 56 is received in a guide groove 59a of a guide and support member 59. This member 59 is fixedly mounted on the base plate 1 such that it is placed in one side of the reciprocating cylinder 54 and adapted to guide a reciprocating movement of the reciprocating cylinder 54. The cam lever 57 extends through a guide hole 59b of the guide and support member 59.

As shown in FIGS. 2 and 4, the pinch roller actuating gear 98 includes a larger gear portion 98a and a smaller gear portion 98b integrally formed with the larger gear portion 98a. The larger gear portion 98a of the pinch roller actuating gear 98 gears into the input gear 53 of the cylindrical cam 52.

The take-up arm 65, supporting the take-up post 66 at the other end thereof, is provided at one end thereof with a gear portion 67 which in turn gears into the pinch roller actuating gear 98.

Figure 8:
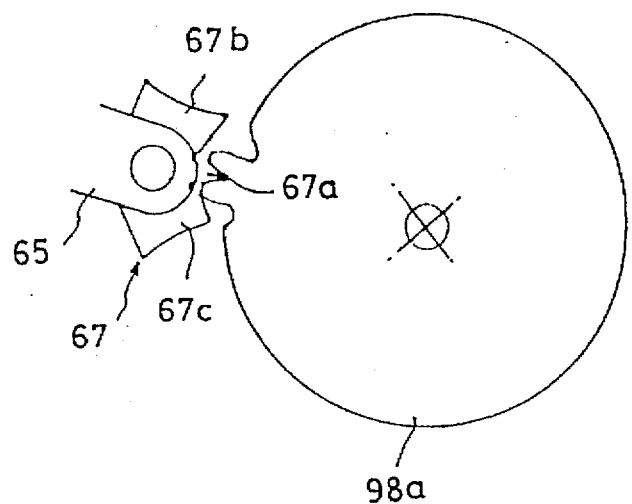
FIG. 8 is an enlarged view of a take-up gear unit of the driving device of the present invention.

As shown in FIG. 8, the gear portion 67 of the take-up arm 65 includes a tooth 67a and a pair of arc-shaped contacts 67b and 67c disposed on both sides of the tooth 67a. Due to the above construction of the gear portion 67, the take-up post 66 of the take-up arm 65 moves at a predetermined angle and then is maintained at the moved position when the pinch roller 62 of the pinch arm 60 moves to its tape loading position by a rotation of the pinch roller actuating gear 98 in one direction. Similarly, when the pinch roller 62 of the pinch arm 60 moves to its tape unloading position by a rotation of the pinch roller actuating gear 98 in the reverse direction, the take-up post 66 reversely moves from the above-mentioned position at a predetermined angle and then is maintained at the moved position.

At the lower surface of the base plate 1, an actuating plate 100 is disposed as shown in FIG. 3. This actuating plate 100 is adapted to move tape take-out and travel guiding elements such as the slant post assemblies 20, the pinch roller 62 and the take-up post 66 between their tape loading and unloading positions and to convert the operation mode. A loading motor 90 is fixedly mounted on the base plate 1 in the right side of the take-up reel 11.

As shown in FIG. 5, the shaft of the loading motor 90 is coupled to a first spur gear 91 and a first worm 92 which are integrally formed with each other. Disposed in parallel to the first spur gear 91 and the first worm 92 of the loading motor 90 are a second spur gear 93 and a second worm 94 which are integrally formed with each other. The second spur gear 93 engages with the first spur gear 91. The second worm 94 is disposed between the base plate 1 and the actuating plate 100 and gears into a worm gear or an actuating gear 95 which is rotatably mounted on the lower surface of the base plate 1.

Figure 6A:
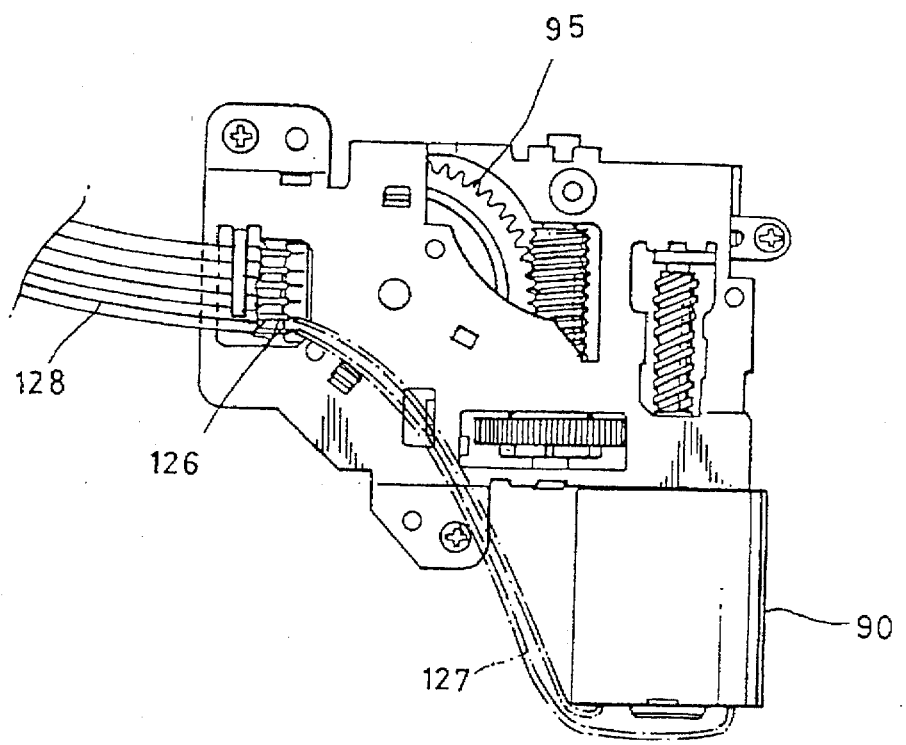
FIG. 6A is an enlarged plan view of a driving device of the present invention.
Figure 6B:
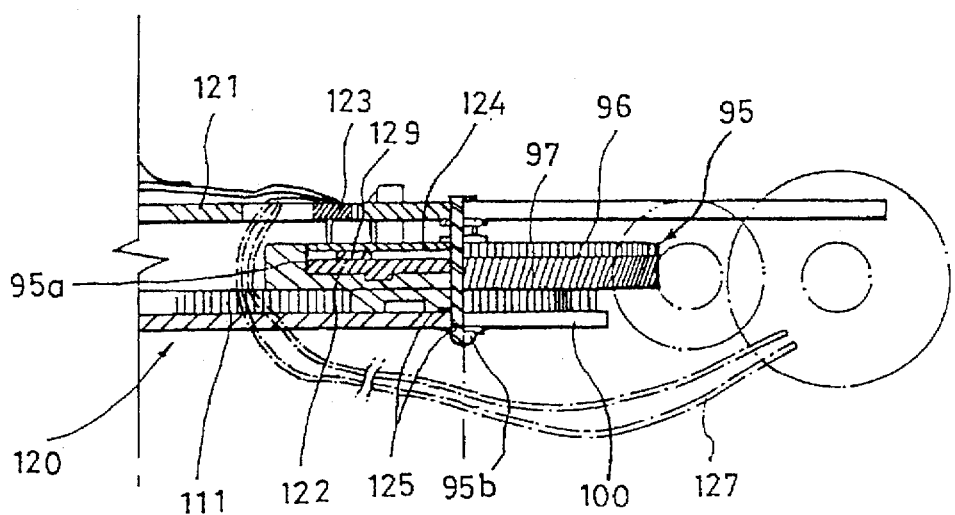
FIG. 6B is a sectional view of the driving device of FIG. 6A.

As best seen in FIG. 6B, the actuating gear 95 comprises a larger gear 96 and a smaller gear 97 which are integrally formed with each other. The teeth of the smaller gear 97 are partially formed on the circumferential surface of the gear 97. The larger gear 96 of the actuating gear 95 gears into the smaller gear portion 98b of the pinch roller actuating gear 98.

The deck mechanism further includes a mode sensing switch unit 120 for sensing an operation mode of the deck mechanism. As shown in FIGS. 6A and 6B, the mode sensing switch unit 120 has a mode switch circuit board 121 fixedly mounted on the base plate 1 above the actuating gear 95 and a mode sensing annular rotation plate 122 received in an annular recess 95a provided on the upper surface of the actuating gear 95 to rotate together with the actuating gear 95. Over the mode sensing rotation plate 122, a mode sensing circuit board 124 is fixed to the mode switch circuit board 121 by means of a fixture 129.

The mode sensing circuit board 124 has a copper foil pattern whereas the mode sensing rotation plate 122 has a contact adapted to come into contact with the copper foil pattern of the mode sensing circuit board 124 during a rotation of the mode sensing rotation plate 122 together with the actuating gear 95. Accordingly, the mode sensing switch unit 120 can sense various operation modes respectively corresponding to various contact positions obtained between the copper foil pattern and the contact while the mode sensing rotation plate 122 rotates together with the actuating gear 95.

A connector 123 is connected to the mode sensing circuit board 124. In FIGS. 6A and 6B, the reference numeral 125 denotes a washer, 127 denotes signal lines for connecting a signal connecting terminal provided at the mode sensing circuit board 124 to a terminal of the loading motor 90, and the numeral 128 denotes signal lines for connecting the connector 123 to a control unit (not shown).

As shown in FIGS. 6A and 6B, all the elements of the mode sensing switch and drive units, including the loading motor 90, a plurality of power transmission gears, the actuating gear 95 and the mode sensing switch 120, are mounted on the mode switch circuit board 121. The mode sensing switch and drive units can be, therefore, regarded as a single assembly.

Figure 7:
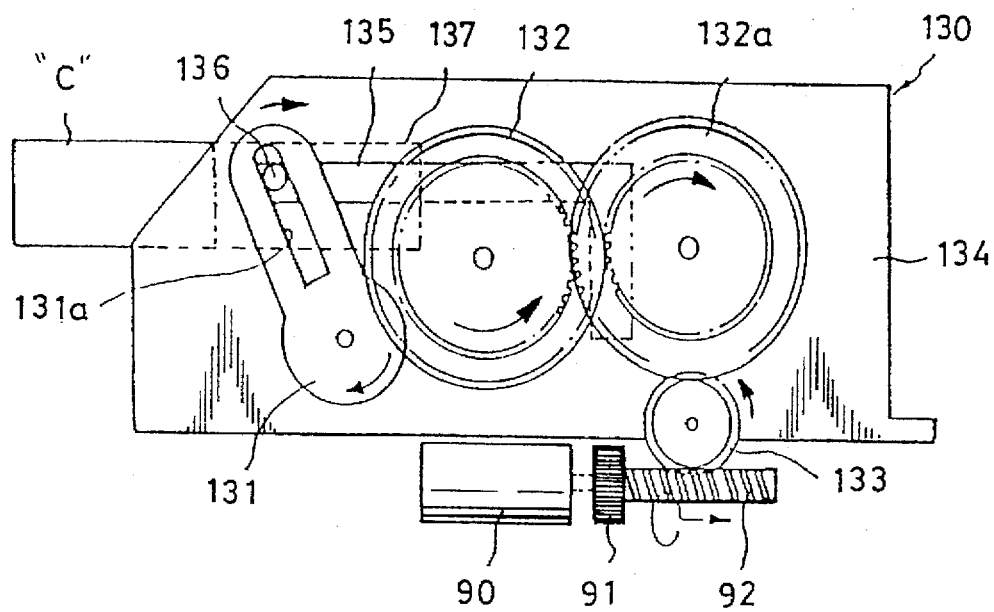
FIG. 7 is a side view of a tape cassette front loading unit of the driving device of the present invention.

As shown in FIG. 7, a front loading housing 130 is provided on the base plate 1 for loading a tape cassette C on a reel table of the base plate 1.

The front loading housing 130 includes a pair of brackets 134 which are mounted on opposed sides of the base plate 1 such that these brackets 134 are parallel to each other. Each of the brackets 134 is provided with an L-shaped guide opening 135 which receives a guide pin 136 of a cassette holder 137 placed inside the bracket 134. Hence, the cassette holder 137 moves horizontally and vertically along the guide opening 135 of the bracket 134. The front loading housing 130 further includes an arm gear 131, a power transmission idle gear 132, a connection gear 132a and a worm gear 133, all the gears 131, 132, 132a and 133 being rotatably mounted on each bracket 134. The worm gear 133 of the front loading housing 130 gears into the first worm 92.

As shown in FIG. 3, the actuating plate 100 has a plurality of longitudinal guide openings, that is, first to third guide openings 101, 102 and 103. The first guide opening 101 receives a shaft 25a of the first loading gear 25, the second guide opening 102 receives a shaft 95b of the actuating gear 95, and the third guide opening 103 receives a guide pin 104 fixed to the lower surface of the base plate 1.

The actuating plate 100 thus linearly reciprocates on the base plate 1 under the guide of the shafts 25a and 95b and of the guide pin 104.

The actuating plate 100 is provided on its right upper surface with a first gear 111 which gears into the smaller gear 97 of the actuating gear 95. A second gear 112 is provided on a left upper surface of the actuating plate 100 and gears into the first loading gear 25.

With the above-mentioned construction, as the loading motor 90 drives, three functional parts, namely, the pinch drive assembly 50, the actuating plate 100 and the front loading housing 130 are simultaneously operated.

In other words, the rotation of the loading motor 90 forces the first and second worms 92 and 94 to rotate. As the first worm 92 rotates, the worm gear 133 of the front loading housing 130 engaging with the first worm 92 rotates, thereby causing the cassette holder 137 to be linearly moved. As the second worm 94 rotates, the actuating gear 95 engaging with the second worm 93 rotates, so that the actuating plate 100 engaging with the actuating gear 95 can be operated. By the rotation of the actuating gear 95, the pinch roller actuating gear 98 engaging with the actuating gear 95 rotates, thereby causing the pinch drive assembly 50 to operate.

In the drawings, the reference numeral 44 denotes a capstan brake, 47 denotes a circuit board and 99 denotes a shaft support bush.

When a tape cassette is inserted into the front loading housing 130 to be loaded at the unloaded state shown in FIGS. 2 and 4 so as to perform a desired operation mode such as play mode, the loading motor 90 rotates in normal direction, thereby causing the first and second worms 92 and 94 to rotate. By the rotations of the first and second worms 92 and 94, the worm gear 133 of front loading housing 130 engaging with the first worm 92 rotates to move the front loading housing 130. As a result, the tape cassette is fed to the interior of the deck mechanism and then seated on both the supply reel 10 and the take-up reel 11. At this time, the actuating gear 95 engaging with the second worm 94 rotates to move the actuating plate 100 engaging with the actuating gear 95. The movement of the actuating plate 100 results in a rotation of the first loading gear 25 engaging with the second gear 112 of actuating plate 100 and thus a rotation of the second loading gear 26. As the first and second loading gears 25 and 26 rotates, the slant post assemblies 20 connected to the loading gears 25 and 26 by the link type loading arms 24 move toward the rotation head drum 3 while carrying the tape. The pinch roller actuating gear 98 engaging with the actuating gear 95 also rotates to drive the pinch drive assembly 50, thereby causing the pinch roller 62 and the take-up post 66 to move to respective loading positions thereof. Thus loading of the tape is completed.

At this state, an operation mode such as play mode or reverse play mode can be performed while the tape is fed in normal or reverse direction by a frictional force generated by the capstan shaft 41 and the pinch roller 62 in rotation of the capstan motor 40. At this time, a selected one of the supply reel 10 and the take-up reel 11 is rotated by the rotational force of the capstan motor 40 transmitted by the idler mechanism 70 through the belt 46.

When the tape cassette is to be unloaded at the loaded state after completion of the operation mode such as play mode, the loading motor 90 rotates in reverse direction, thereby causing the first and second worms 92 and 94 to rotate reversely. By the reverse rotations of the first and second worms 92 and 94, the worm gear 133 of front loading housing 130 engaging with the first worm 92 rotates to move the front cassette holder 137 in reverse direction. As a result, the tape cassette is fed outwardly from the interior of the deck mechanism so as to be ejected from the front loading housing 130. By the rotation of second worm 94, the actuating gear 95 rotates to move the actuating plate 100 engaging with the actuating gear 95. As a result, the first loading gear 25 and the second loading gear 26 rotate reversely, so that the slant post assemblies 20 move toward the supply reel 10 and the take-up reel 11, respectively. The pinch roller actuating gear 98 engaging with the actuating gear 95 also rotates to drive the pinch drive assembly 50, thereby causing the pinch roller 62 and the take-up post 66 to move to respective unloading positions thereof. Thus unloading of the tape is completed.

As described above, in accordance with a driving device of the present invention, a pinch drive assembly, an actuating plate and a front loading housing are commonly operated by a single loading motor at an appropriate reduction gear ratio. Accordingly, the present invention provides advantages of a light, thin, simple and compact construction and a reduction in manufacturing cost.

In conventional constructions, it is necessary for provisions of a cam gear for transmitting the rotational force of a motor and a complicated transmission construction for transmitting the drive force of the cam gear to loading gears, in order to rotate the loading gear and to move slant post assemblies. In accordance with the present invention, however, the construction for driving the loading gears is very simple because the first loading gear is driven by the second rack of the actuating plate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driving device for a magnetic recording and reproducing apparatus comprising:

a reversible motor mounted on a base plate at a side of a tape take-up reel;

a first worm connected to an output shaft of said reversible motor;

tape cassette loading means having gear means engaged to said first worm;

a second worm rotatably coupled to said first worm and disposed abreast of and parallel with the first worm;

an actuating gear for driving a mode sensing switch unit, said actuating gear having a mode sensing annular rotation plate located on its upper surface, said actuating gear including a first gear and a second gear rotating about a common axis in spaced-apart parallel planes, said first gear directly engaged with said second worm;

pinch roller drive means including a pinch roller drive gear directly engaged with said first gear;

an actuating plate including a first rack gear, said first rack gear directly engaged with said second gear such that the rate of angular rotation of the second gear is converted to a corresponding rate of linear movement of the first rack gear; and slant post drive means connected to and driven by said actuating plate for drawing out magnetic tape from a tape cassette loaded into said magnetic recording and reproducing apparatus by said tape cassette loading means.

2. The driving device according to claim 1, further comprising:

said mode sensing switch unit having a mode switch circuit board for sensing an operation mode of a deck of said apparatus, said mode switch circuit board rotatably supporting said actuating gear, said actuating gear having an annular recess in said upper surface;

said mode sensing annular rotation plate being received in said annular recess of said actuating gear for allowing the annular rotation plate to rotate together with said actuating gear;

a mode sensing circuit board fixed to said mode switch circuit board in a predetermined spaced position with respect to said annular recess; and a connector connected to a side of said mode sensing circuit board.

3. The driving device according to claim 2, wherein said first gear includes a worm gear portion engaging said second worm, and a spur gear portion engaging said pinch roller drive gear.

4. The driving device according to claim 1, wherein said first gear includes a worm gear portion engaging said second worm, and a spur gear portion engaging said pinch roller drive gear.

5. The driving device according to claim 4, wherein said worm gear portion and said spur gear portion are approximately the same diameter.

6. The driving device according to claim 1, wherein said slant post drive means includes a loading gear, and said actuating plate further includes a second rack gear drivingly engaged with said loading gear.

7. The driving device according to claim 6, further including take-up post drive means for driving a take-up post, said take-up post drive means including a tooth member driven by said pinch roller drive gear.

8. The driving device according to claim 1, further comprising a first spur gear, fixed to said first worm, and a second spur gear fixed to said second worm and engaged with said first spur gear, whereby rotation of said first worm and said first spur gear in a first direction causes said second spur gear and said second worm to rotate in an opposite direction.

9. The driving device according to claim 1, wherein said gear means of said tape cassette loading means further includes a worm gear engaged with said first worm and rotatable about an axis substantially perpendicular to said common axis about which said first gear and said second gear rotate.

10. The driving device according to claim 9, further comprising a first spur gear fixed to said first worm, and a second spur gear fixed to said second worm and engaged with said first spur gear, whereby rotation of said first worm and said first spur gear in a first direction causes said second spur gear and said second worm to rotate in an opposite direction.

11. The driving device according to claim 1, further including take-up post drive means for driving a take-up post, said take-up post drive means including a tooth member driven by said pinch roller drive gear.

12. The driving device according to claim 1, wherein said pinch roller drive means further includes a cylindrical cam rotatably driven by said pinch roller drive gear.

13. The driving device according to claim 12, wherein said gear means of said tape cassette loading means further includes a worm gear engaged with said first worm and rotatable about an axis substantially perpendicular to said common axis about which said first gear and said second gear rotate.

14. The driving device according to claim 12, wherein said pinch roller drive means further includes a cylinder surrounding a portion of said cylindrical cam, said cylindrical cam including a spiral cam groove therein, said cylinder including a cam protrusion therein for location with said cam groove.

15. The driving device according to claim 14, wherein said gear means of said tape cassette loading means further includes a worm gear engaged with said first worm and rotatable about an axis substantially perpendicular to said common axis about which said first gear and said second gear rotate.

16. The driving device according to claim 15, further comprising a first spur gear fixed to said first worm, and a second spur gear fixed to said second worm and engaged with said first spur gear, whereby rotation of said first worm and said first spur gear in a first direction causes said second spur gear and said second worm to rotate in an opposite direction.

17. The driving device according to claim 16, wherein said slant post drive means includes a loading gear, and said actuating plate further includes a second rack gear drivingly engaged with said loading gear.

18. The driving device according to claim 17, wherein said first gear includes a worm gear portion engaging said second worm, and a spur gear portion engaging said pinch roller drive gear.

19. The driving device according to claim 18, wherein said worm gear portion and said spur gear portion are approximately the same diameter.

20. The driving device according to claim 19, further including take-up post drive means for driving a take-up post, said take-up post drive means including a tooth member driven by said pinch roller drive gear.

* * * * *